US009529633B2

United States Patent
Earl et al.

(10) Patent No.: US 9,529,633 B2
(45) Date of Patent: Dec. 27, 2016

(54) VARIABLE TIMESLICES FOR PROCESSING LATENCY-DEPENDENT WORKLOADS

(71) Applicant: Amazon Technologies, Inc., Reno, NV (US)

(72) Inventors: William John Earl, Burien, WA (US); John Merrill Phillips, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 71 days.

(21) Appl. No.: 14/484,197

(22) Filed: Sep. 11, 2014

(65) Prior Publication Data

US 2016/0077845 A1    Mar. 17, 2016

(51) Int. Cl.
G06F 9/455    (2006.01)
G06F 9/48    (2006.01)
G06F 9/50    (2006.01)

(52) U.S. Cl.
CPC ......... *G06F 9/5027* (2013.01); *G06F 9/45558* (2013.01); *G06F 9/4856* (2013.01); *G06F 9/5088* (2013.01); *G06F 2009/4557* (2013.01)

(58) Field of Classification Search
None
See application file for complete search history.

(56) References Cited

U.S. PATENT DOCUMENTS

| 6,434,708 | B1 | 8/2002 | Dunnihoo et al. |
| 6,625,635 | B1 | 9/2003 | Elnozahy |
| 7,228,509 | B1* | 6/2007 | Dada .................. G06F 17/505 716/102 |
| 7,451,447 | B1* | 11/2008 | Deshpande ........... G06F 9/4812 718/102 |
| 8,166,480 | B2 | 4/2012 | Fontenot et al. |
| 8,799,908 | B2 | 8/2014 | Arges et al. |
| 2009/0217276 | A1* | 8/2009 | Brenner ................ G06F 9/4856 718/102 |

(Continued)

OTHER PUBLICATIONS

Duda et al. Borrowed-Virtual-Time (BVT) scheduling: supporting latency-sensitive threads in a general-purpose scheduler. [online] (1999). ACM., pp. 261-276. Retrieved From the Internet <http://citeseerx.ist.psu.edu/viewdoc/download?doi=10.1.1.297.205&rep=rep1&type=pdf>.*

(Continued)

*Primary Examiner* — Emerson Puente
*Assistant Examiner* — Jonathan R Labud
(74) *Attorney, Agent, or Firm* — Robert C. Kowert; Meyertons, Hood, Kivlin, Kowert & Goetzel, P.C.

(57) ABSTRACT

A virtualization host may implement variable timeslices for processing latency dependent workloads. Multiple virtual compute instances on a virtualization host may utilize virtual central processing units (vCPUs) to obtain physical processing resources, such as one or more central processing units (CPUs). A vCPU currently utilizing a CPU to performing processing work according to a scheduled timeslice may be preempted by a latency dependent vCPU before completion of the scheduled timeslice. The latency-dependent vCPU may complete processing work, and utilization of the CPU may be returned to the vCPU. A preemption compensation may be determined for the scheduled timeslice to increase the scheduled timeslice for the vCPU such that utilization for the vCPU is performed according to the increased scheduled timeslice.

20 Claims, 6 Drawing Sheets

(56) References Cited

U.S. PATENT DOCUMENTS

2013/0036213 A1* 2/2013 Hasan ................ H04L 67/1097
709/223

OTHER PUBLICATIONS

Lai et al. Tycoon: a Distributed Market-based Resource Allocation System. [online] (Feb. 1, 2008). HP Labs., pp. 1-8. Retrieved From the Internet <http://arxiv.org/pdf/cs/0404013.pdf>.*
U.S. Appl. No. 14/331,745, filed Jul. 15, 2014, John Merrill Phillips, et al.

* cited by examiner

VARIABLE TIMESLICES FOR PROCESSING LATENCY-DEPENDENT WORKLOADS

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Virtualization technologies may be leveraged to create many different types of services or perform different functions for client systems or devices. For example, virtual machines may be used to implement a network-based service for external customers, such as an e-commerce platform. Virtual machines may also be used to implement a service or tool for internal customers, such as information technology (IT) service implemented as part of an internal network for a corporation. Utilizing these virtual resources efficiently, however, may require flexible utilization options for many different types of virtual resource workloads. In some environments multiple virtual machines may be hosted together on a single host, creating the possibility for contention and conflicts when utilizing different virtual computing resources that may rely upon the same physical computer resources.

Figure 1:
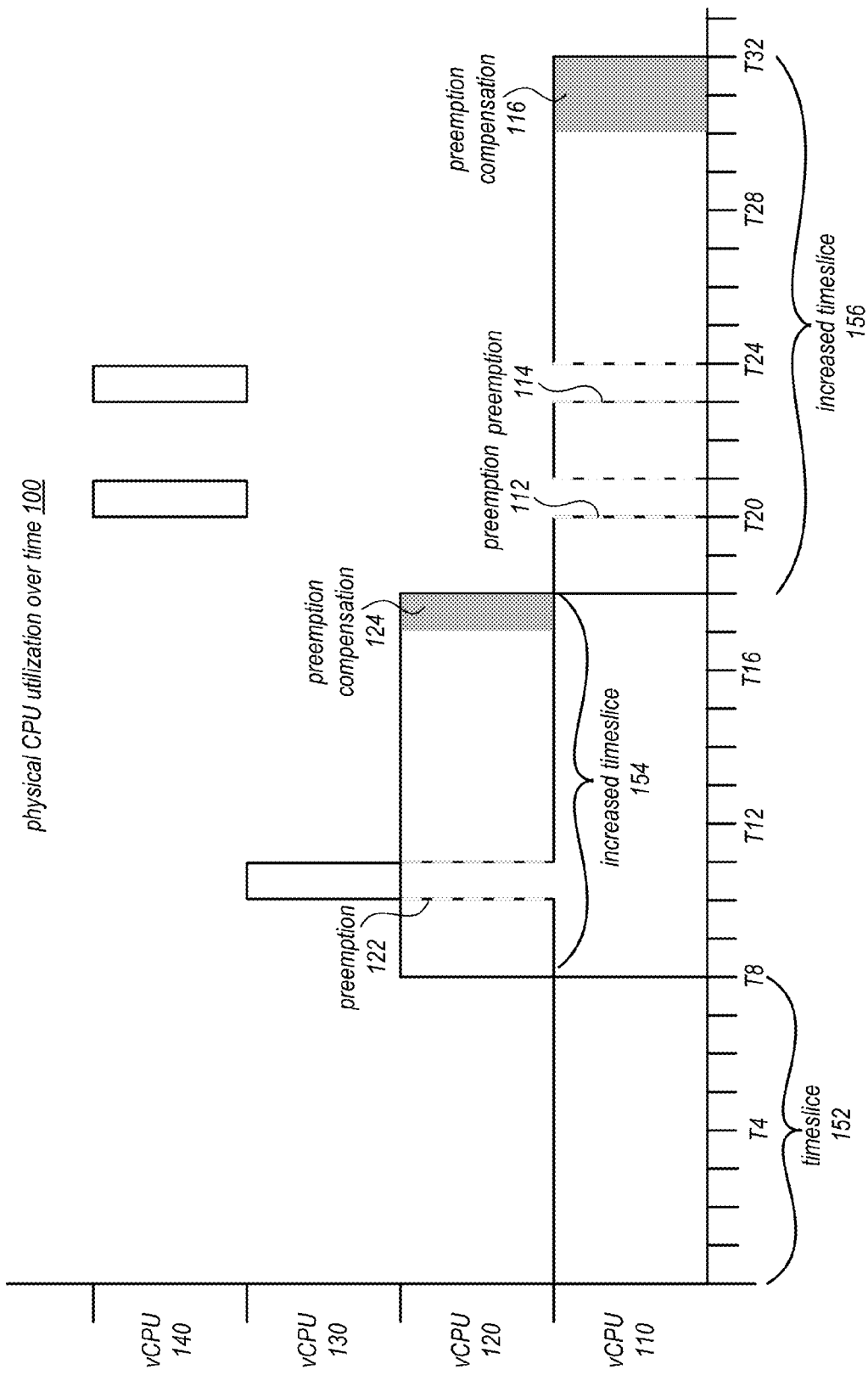
FIG. 1 is a timeline illustrating variable timeslices for processing latency-dependent workloads at a virtualization host, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement variable timeslices for latency-dependent workloads at a virtualization host, according to some embodiments. Virtualization hosts may provide virtualized devices or resources as part of implementing virtual compute instances. These virtualized devices may provide a virtual compute instance with access to an underlying physical resource corresponding to the virtual resource. For example, a virtual central processing unit (vCPU) may be implemented for a compute instance, which can in turn be utilized to access a physical central processing unit (CPU).

As differing virtual compute instances may perform different tasks or functions, so too may vCPUs implemented for the virtual compute instances processing different types of workloads. Some processing workloads may be processing intensive, and thus may be performed without waiting on another component or device to perform, in various embodiments. Other processing workloads may enter wait states until the completion of some other operation, such as an input/output (I/O) operation. Implementing scheduling techniques to handle these different workloads often optimizes one type of workload at the expense of another. Variable timeslices may be implemented to provide for optimal handling of different workloads.

Timeslices may be implemented to determine an amount of time up to which a vCPU may utilize a processing resource, such as a central processing unit (CPU). A scheduling technique may be implemented to select a vCPU to utilize the processing resource according to a timeslice. If, for example, a vCPU is selected that performs intensive processing operations, the first vCPU may utilize the entire timeslice and not finish performing the processing operations. If another vCPU is selected that only performs a few operations and then waits on the response, then the vCPU may spend the rest of the timeslice waiting on a response (if none is received then a subsequent time slice may provide sufficient time for the response). Instead of waiting, the other vCPU may yield the remaining timeslice, and resume processing when the response is received. In such a scenario, the other vCPU may preempt another vCPU utilizing the processing resource to continue processing based on the response.

Preempting a running vCPU to allow another vCPU to utilize a processing resource may trigger a context switch, in various embodiments. A context switch, may involve changing register values for the processing resource as well as loading different data into a cache which is used for performing processing for the vCPU taking over the processing resource. Context switching consumes a portion of a timeslice allotted to a vCPU. Moreover, as the preempting vCPU performs tasks, the data in a cache may be changed (from the data used by the preempted vCPU). If a processing intensive vCPU like the first example vCPU given runs for an entire timeslice, multiple other vCPUs may potentially preempt the long running vCPU and reducing the amount of the timeslice available for processing for each context switch performed, as well as the time to return the state of a cache to include data for the long running vCPU, increasing processing throughput. If preemption occurs too often, a preempted vCPU may make little progress due to side effects such as cache thrashing. In various embodiments, preemption compensation may be provided to vCPUs that are preempted to allow latency-dependent vCPUs to utilize the processing resource. A preemption compensation may increase the timeslice of for a preempted vCPU. The preemption compensation may be determined based, at least in part, on a reduction in throughput of the preempted vCPU as a result of performing the preemption FIG. 1 is a timeline illustrating variable timeslices for processing latency-dependent workloads at a virtualization host, according to some embodiments. A physical CPU may be utilized different virtual CPUs, such as vCPU 110, vCPU 120, vCPU 130, and vCPU 140. The timeline illustrates utilization of the physical CPU by vCPUs 110, 120, 130, and 140 over time 100. For example, vCPU 110 is illustrated as utilizing the physical CPU from 0 to T8. For this utilization, a scheduled timeslice of 152 may be used to determine the duration for which vCPU 110 may utilize the physical CPU. As vCPU 110 is not preempted during this timeslice 152, then no preemption compensation is determined to increase timeslice 152.

At time T8, vCPU 120 begins utilizing the physical CPU. However, a preemption event 122 occurs at T10, switching utilization of the physical CPU to vCPU 130. As noted above, vCPU 130 may be latency-dependent. Thus, as illustrated in FIG. 1, the utilization of the physical CPU by vCPU 130 is small relative to the utilization vCPU 120 (e.g., completing utilization at T11). Upon resuming utilization of the physical CPU by vCPU 120, a preemption compensation 124 may be determined. The preemption compensation 124 may be used to increase the timeslice 154 for vCPU 120 (e.g., increasing the timeslice to end at T18). Multiple preemptions may occur for a vCPU during a timeslice. For example, increased timeslice 156 for vCPU 110 illustrates two different preemption events, 112 and 114, to allow vCPU 140 to utilize the physical CPU. Preemption compensation for a timeslice may be dynamic, increasing as the number of preemption events increases. For example, preemption compensation 116 for vCPU 110 appears larger than preemption compensation 124 for vCPU 120 (as the number of preemptions for vCPU 110 was greater).

Increasing a timeslice for a vCPU may be limited to the timeslice in which a preemption event occurs. For example, the next time vCPU 110 utilizes the physical CPU, a default timeslice (e.g., timeslice 152) may be again scheduled for vCPU 110. Yet, in some embodiments, preemption compensation may be provided to increase the timeslice for multiple timeslices for a particular vCPU (e.g., based on analysis of historical preemption events for a vCPU, increasing the timeslice may be performed proactively).

Please note that previous descriptions are not intended to be limiting, but are merely provided as an example of variable timeslices for processing latency-dependent workloads. The timeslices, preemptions, number of vCPUs or CPUs may all be different. Moreover representations as to the length of utilization for long running vCPUs or latency-dependent vCPUs are not necessarily drawn to scale. For example, the length of a preemption compensation may not be equivalent to the length of time a preempting vCPU utilizes the CPU. Moreover, although some vCPUs are depicted as latency-dependent and some are not, a vCPU may switch from becoming latency-dependent to not latency-dependent (or vice versa).

This specification next includes a general description of a provider network, which may implement variable timeslices for latency-dependent workloads at a virtualization host. Then various examples of a provider network are discussed, including different components/modules, or arrangements of components/module that may be employed as part of the provider network. A number of different methods and techniques to implement variable timeslices for latency-dependent workloads at a virtualization host are then discussed, some of which are illustrated in accompanying flowcharts. Finally, a description of an example computing system upon which the various components, modules, systems, devices, and/or nodes may be implemented is provided. Various examples are provided throughout the specification.

Different clients implementing virtual computing resources have different resource demands. For example, some clients' workloads are not predictable and may not utilize fixed resources efficiently. Virtual compute instances implementing resource credits for scheduling virtual computing resources may provide dynamic utilization of resources to provide flexible high performance, without wasting unutilized fixed resources. Resource credits may be accumulated for individual virtual compute instances and maintained as part of an individual resource credit balance. When a virtual compute instance needs to perform work at high performance, the resource credits may be applied to the work, effectively providing full utilization of underlying physical resources for the duration of the resource credits. When a virtual compute instance is using less than its share of resources (e.g., little or no work is being performed), credits may be accumulated and used for a subsequent task. Resources may, in various embodiments, be any virtualized computer resource that is implemented or performed by a managed physical computer resource, including, but not limited to, processing resources, communication or networking resources, and storage resources.

Figure 2:
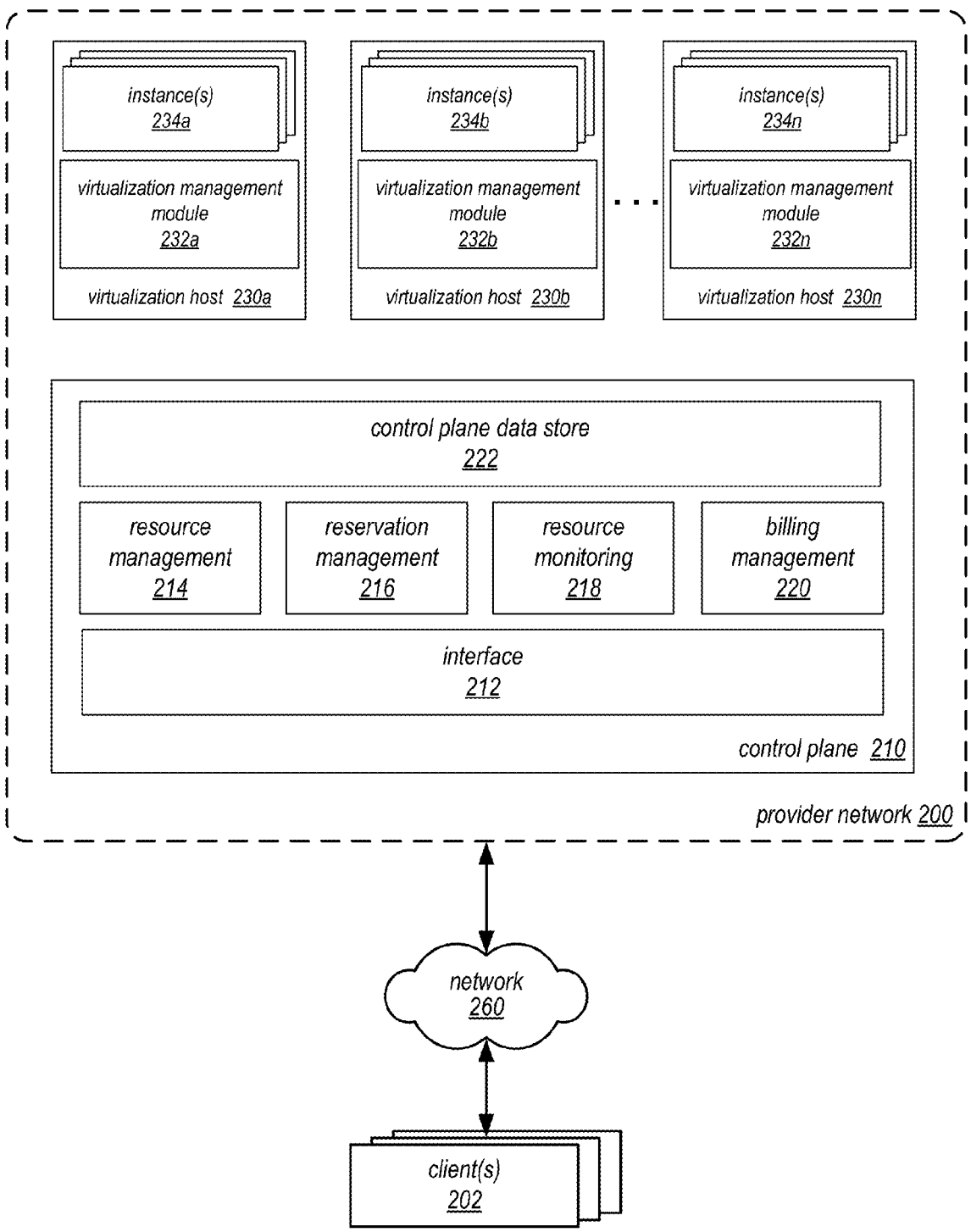
FIG. 2 is a block diagram illustrating a provider network that provides virtual compute instances for which variable timeslices for processing latency-dependent workloads are implemented, according to some embodiments.

FIG. 2 is a block diagram illustrating a provider network that provides virtual compute instances for which variable timeslices for processing latency-dependent workloads are implemented, according to some embodiments. Provider network 200 may be set up by an entity such as a company or a public sector organization to provide one or more services (such as various types of cloud-based computing or storage) accessible via the Internet and/or other networks to clients 202. Provider network 200 may include numerous data centers hosting various resource pools, such as collections of physical and/or virtualized computer servers, storage devices, networking equipment and the like, needed to implement and distribute the infrastructure and services offered by the provider network 200. In some embodiments, provider network 200 may provide computing resources. These computing resources may in some embodiments be offered to clients in units called "instances," 234 such as virtual compute instances.

In various embodiments, provider network 200 may implement a control plane 210 in order to manage the computing resource offerings provided to clients 202 by provider network 200. Control plane 210 may implement various different components to manage the computing resource offerings. Control plane 210 may be implemented across a variety of servers, nodes, or other computing systems or devices (such as computing system 1000 described below with regard to FIG. 6). It is noted that where one or more instances of a given component may exist, reference to that component herein may be made in either the singular or the plural. However, usage of either form is not intended to preclude the other.

In at least some embodiments, control plane 210 may implement interface 212. Interface 212 may be configured to process incoming requests received via network 260 and direct them to the appropriate component for further processing. In at least some embodiments, interface 212 may be a network-based interface and may be implemented as a graphical interface (e.g., as part of an administration control panel or web site) and/or as a programmatic interface (e.g., handling various Application Programming Interface (API) commands). In various embodiments, interface 212 may be implemented as part of a front end module or component dispatching requests to the various other components, such as resource management 214, reservation management 216, resource monitoring 218, and billing 220. Clients 202, in various embodiments, may not directly provision, launch or configure resources but may send requests to control plane 210 such that the illustrated components (or other components, functions or services not illustrated) may perform the requested actions.

Control plane 210 may implement resource management module 214 to manage the access to, capacity of, mappings to, and other control or direction of computing resources offered by provider network. In at least some embodiments, resource management module 214 may provide both a direct sell and $3^{rd}$ party resell market for capacity reservations (e.g., reserved compute instances). For example, resource management module 214 may allow clients 202 via interface 212 to learn about, select, purchase access to, and/or reserve capacity for computing resources, either from an initial sale marketplace or a resale marketplace, via a web page or via an API. For example, resource management component may, via interface 212, provide listings of different available compute instance types, each with a different credit accumulation rate. Additionally, in some embodiments, resource management module 214 may be configured to offer credits for purchase (in addition to credits provided via the credit accumulation rate for an instance type) for a specified purchase amount or scheme (e.g., lump sum, additional periodic payments, etc.). For example, resource management module 214 may be configured to receive a credit purchase request (e.g., an API request) and credit the virtual instance balance with the purchased credits. Similarly, resource management module 214 may be configured to handle a request to increase a credit accumulation rate for a particular instance. Resource management 214 may also offer and/or implement a flexible set of resource reservation, control and access interfaces for clients 202 via interface 212. For example resource management module 214 may provide credentials or permissions to clients 202 such that compute instance control operations/interactions between clients and in-use computing resources may be performed.

In various embodiments, reservation management module 216 may be configured to handle the various pricing schemes of instances 234 (at least for the initial sale marketplace) in various embodiments. For example network-based virtual computing service 200 may support several different purchasing modes (which may also be referred to herein as reservation modes) in some embodiments: for example, term reservations (i.e. reserved compute instances), on-demand resource allocation, or spot-price-based resource allocation. Using the long-term reservation mode, a client may make a low, one-time, upfront payment for a compute instance or other computing resource, reserve it for a specified duration such as a one or three year term, and pay a low hourly rate for the instance; the client would be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of compute instance or other computing resource, and if the client's maximum price exceeded a dynamic spot price determined at least in part by supply and demand, that type of resource would be provided to the client.

During periods when the supply of the requested resource type exceeded the demand, the spot price may become significantly lower than the price for on-demand mode. In some implementations, if the spot price increases beyond the maximum bid specified by a client, a resource allocation may be interrupted—i.e., a resource instance that was previously allocated to the client may be reclaimed by the resource management module 330 and may be allocated to some other client that is willing to pay a higher price. Resource capacity reservations may also update control plane data store 222 to reflect changes in ownership, client use, client accounts, or other resource information.

In various embodiments, control plane 210 may implement resource monitoring module 218. Resource monitoring module 218 may track the consumption of various computing instances, (e.g., resource credit balances, resource credit consumption) consumed for different virtual computer resources, clients, user accounts, and/or specific instances. In at least some embodiments, resource monitoring module 218 may implement various administrative actions to stop, heal, manage, or otherwise respond to various different scenarios in the fleet of virtualization hosts 230 and instances 234. Resource monitoring module 218 may also provide access to various metric data for client(s) 202 as well as manage client configured alarms.

In various embodiments, control plane 210 may implement billing management module 220. Billing management module 220 may be configured to detect billing events (e.g., specific dates, times, usages, requests for bill, or any other cause to generate a bill for a particular user account or payment account linked to user accounts). In response to detecting the billing event, billing management module may be configured to generate a bill for a user account or payment account linked to user accounts.

A virtual compute instance 234 may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances 234 of network-based virtual computing service 200 in different embodiments, including general purpose or special purpose computer servers, storage devices, network devices and the like. In some embodiments instance clients 202 or other any other user may be configured (and/or authorized) to direct network traffic to a compute instance 234.

Compute instances 234 may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 202 applications, without for example requiring the client 202 to access an instance 234. There may be various different types of compute instances. In at least some embodiments, there may be compute instances that implement resource credit balances for scheduling virtual computer resource operations. This type of instance may perform based on resource credits, where resource credits represent time an instance can spend on a physical resource doing work (e.g., processing time on a physical CPU, time utilizing a network communication channel, etc.). The more resource credits an instance has for computer resources, the more time it may spend on the physical resources executing work (increasing performance). Resource credits may be provided at launch of an instance, and may be defined as utilization time (e.g., CPU time, such as CPU-minutes), which may represent the time an instance's virtual resources can spend on underlying physical resources performing a task.

In various embodiments, resource credits may represent time or utilization of resources in excess of a baseline utilization guarantee. For example, a compute instance may have a baseline utilization guarantee of 10% for a resource, and thus resource credits may increase the utilization for the resource above 10%. Even if no resource credits remain, utilization may still be granted to the compute instance at the 10% baseline. Credit consumption may only happen when the instance needs the physical resources to perform the work above the baseline performance. In some embodiments credits may be refreshed or accumulated to the resource credit balance whether or not a compute instance submits work requests that consume the baseline utilization guarantee of the resource.

Different types of compute instances implementing resource credits for scheduling computer resources may be offered. Different compute instances may have a particular number of virtual CPU cores, memory, cache, storage, networking, as well as any other performance characteristic. Configurations of compute instances may also include their location, in a particular data center, availability zone, geographic, location, etc. . . . and (in the case of reserved compute instances) reservation term length. Different compute instances may have different resource credit accumulation rates for different virtual resources, which may be a number of resource credits that accumulate to the current balance of resource credits maintained for a compute instance. For example, one type of compute instance may accumulate 6 credits per hour for one virtual computer resource, while another type of compute instance may accumulate 24 credits per hour for the same type of virtual computer resource, in some embodiments. In another example the resource credit accumulation rate for one resource (e.g., vCPU) may be different than the resource credit accumulation rate for a different virtual computer resource (e.g., networking channel) for the same virtual compute instance. In some embodiments, multiple different resource credit balances may be maintained for a virtual compute instance for the multiple different virtual computer resources used by the virtual compute instances. A baseline performance guarantee may also be implemented for each of the virtual computer resources, which may be different for each respective virtual computer resource, as well as for the different instance types.

Baseline performance guarantees may be included along with the resource credit accumulation rates, in some embodiments. Thus, in one example, an instance type may include a specific resource credit accumulation rate and guaranteed baseline performance for processing, and another specific resource credit accumulation rate and guaranteed baseline performance rate for networking channels. In this way, provider network 200 may offer many different types of instances with different combinations of resource credit accumulation rates and baseline guarantees for different virtual computer resources. These different configurations may be priced differently, according to the resource credit accumulation rates and baseline performance rates, in addition to the various physical and/or virtual capabilities. In some embodiments, a virtual compute instance may be reserved and/or utilized for an hourly price. While, a long-term reserved instance configuration may utilize a different pricing scheme, but still include the credit accumulation rates and baseline performance guarantees.

Figure 4:
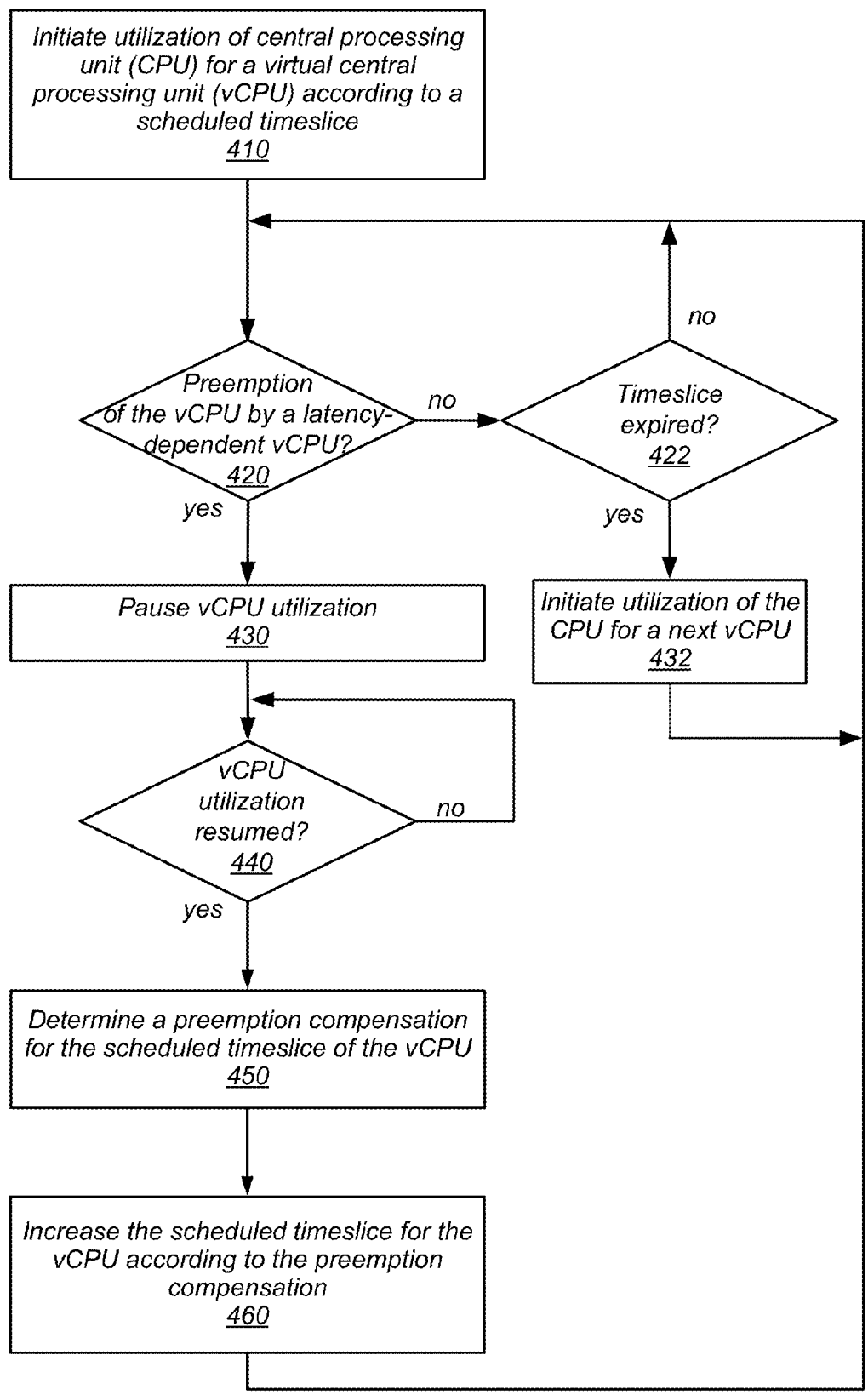
FIG. 4 is high-level flowchart illustrating various methods and techniques for implementing variable timeslices for processing latency-dependent workloads, according to some embodiments.

As illustrated in FIG. 2, a virtualization host 230, such as virtualization hosts 230a, 230b, through 230n, may implement and/or manage multiple compute instances 234, in some embodiments, and may be one or more computing devices, such as computing system 1000 described below with regard to FIG. 4. A virtualization host 230 may include a virtualization management module 232, such as virtualization management modules 232a, 232b through 232n, capable of instantiating and managing a number of different client-accessible virtual machines or compute instances 234. The virtualization management module 232 may include, for example, a hypervisor and an administrative instance of an operating system, which may be termed a "domain-zero" or "dom0" operating system in some implementations. The dom0 operating system may not be accessible by clients on whose behalf the compute instances 234 run, but may instead be responsible for various administrative or control-plane operations of the network provider, including handling the network traffic directed to or from the compute instances 234. Virtualization management module 232 may be configured to implement variable timeslices for processing latency-dependent workloads for different instances 234.

Client(s) 202 may encompass any type of client configurable to submit requests to provider network 200. For example, a given client 202 may include a suitable version of a web browser, or may include a plug-in module or other type of code module configured to execute as an extension to or within an execution environment provided by a web browser. Alternatively, a client 202 may encompass an application such as a dashboard application (or user interface thereof), a media application, an office application or any other application that may make use of compute instances 234 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 202 may be configured to generate network-based services requests according to a Representational State Transfer (REST)-style network-based services architecture, a document- or message-based network-based services architecture, or another suitable network-based services architecture. In some embodiments, a client 202 (e.g., a computational client) may be configured to provide access to a compute instance 234 in a manner that is transparent to applications implement on the client 202 utilizing computational resources provided by the compute instance 324.

Clients 202 may convey network-based services requests to network-based virtual computing service 200 via network 260. In various embodiments, network 260 may encompass any suitable combination of networking hardware and protocols necessary to establish network-based communications between clients 202 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 202 and network-based virtual computing service 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 202 and the Internet as well as between the Internet and provider network 200. It is noted that in some embodiments, clients 202 may communicate with provider network 200 using a private network rather than the public Internet.

Figure 3:
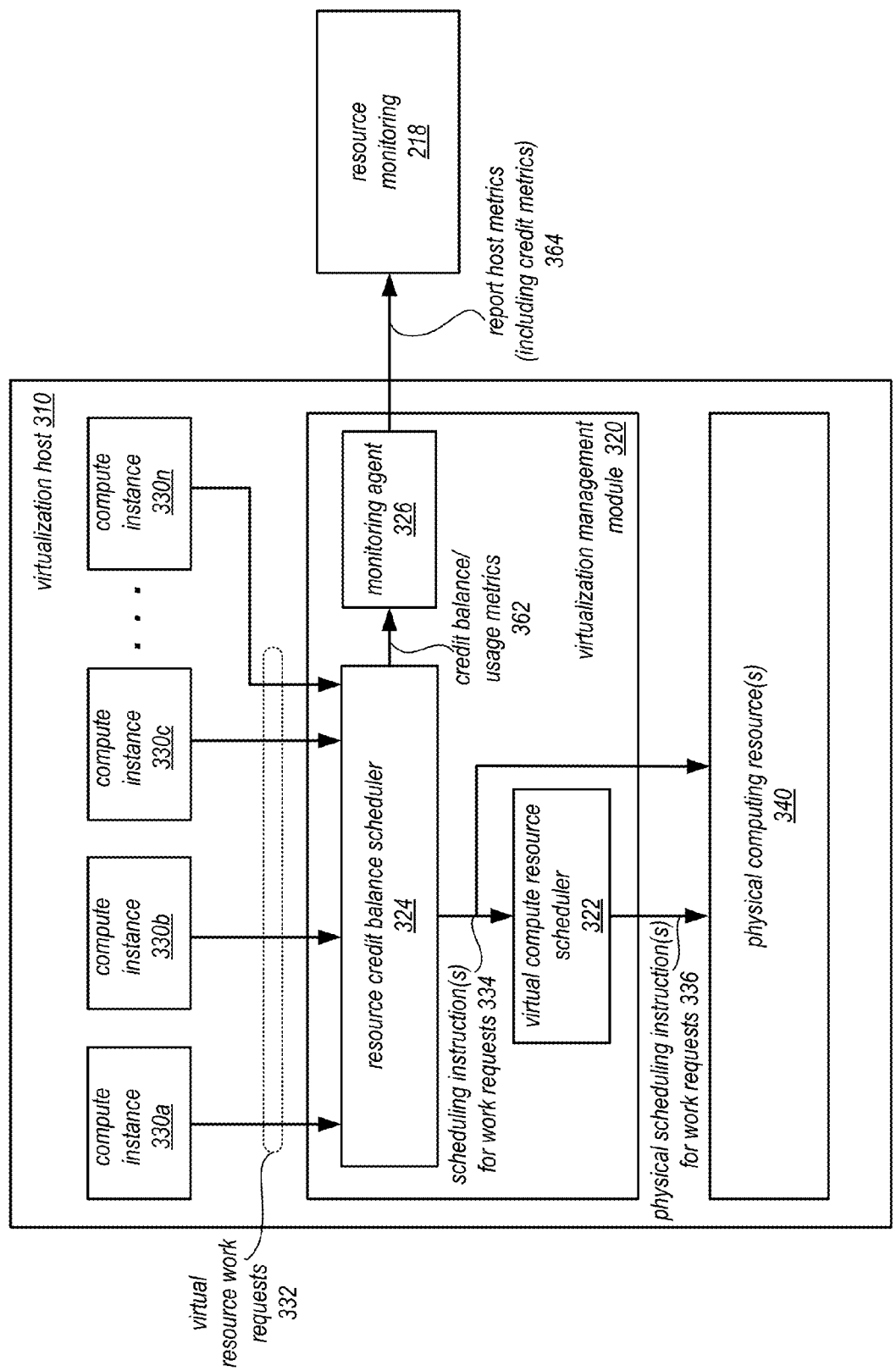
FIG. 3 is a block diagram illustrating a virtualization host that implements variable timeslices for processing latency-dependent workloads, according to some embodiments.

FIG. 3 is a block diagram illustrating a virtualization host that implements variable timeslices for processing latency-dependent workloads, according to some embodiments. As noted above in FIG. 2, virtualization hosts may serve as a host platform for one or more virtual compute instances. These virtual compute instances may utilize virtualized hardware interfaces to perform various tasks, functions, services and/or applications. As part of performing these tasks, virtual compute instances may utilize virtualized computer resources (e.g., virtual central processing unit(s) (vCPU(s)) which may act as the virtual proxy for the physical CPU(s)) implemented at the virtualization host in order to perform work on respective physical computer resources for the respective compute instance.

FIG. 3 illustrates virtualization host 310. Virtualization host 310 may host compute instances 330a, 330b, 330c, through 330n. In at least some embodiments, the compute instances 330 may be the same type of compute instance. In FIG. 3, compute instances 330 are compute instances that implement resource credits for scheduling virtual computer resources. Virtualization host 310 may also implement virtualization management module 320, which may handle the various interfaces between the virtual compute instances 330 and physical computing resource(s) 340 (e.g., various hardware components, processors, I/O devices, networking devices, etc.).

In FIG. 3, virtualization management module 320 may implement resource credit balance scheduler 324. Resource credit balance scheduler 324 may act as a meta-scheduler, managing, tracking, applying, deducting, and/or otherwise handling all resource credit balances for each of compute instances 330. In various embodiments resource credit balance scheduler 324 may be configured to receive virtual compute resource work requests 332 from computes instances. Each work request 332 may be directed toward the virtual computer resource corresponding to the compute instance that submitted the work. For each request 332, resource credit balance scheduler 324 may be configured to determine a current resource credit balance for the requesting compute instance 330, and generate scheduling instructions to apply resource credits when performing the work request. In some embodiments, resource credit balance scheduler 324 may perform or direct the performance of the scheduling instructions, directing or sending the work request to the underlying physical computing resources 340 to be performed. For example, in some embodiments different hardware queues may be implemented and resource credit balance scheduler 324 may be used to place tasks for performing work requests in the queues according to the applied resource credits (e.g., queuing tasks according to the amount of time of applied resource credits). However, in some embodiments the resource scheduling instructions may be sent 334 to virtual compute resource scheduler 322, which may be a scheduler for the physical resources 340, such as CPU(s), implemented at virtualization host 310. Resource credit balance scheduler 324 and/or virtual compute resource scheduler 322 may be configured to perform the various techniques described below with regard to FIGS. 4-5, in order to provide preemption compensation for work performed on behalf of different vCPUs for instances 330, apply resource credits, deduct resource credits, and/or otherwise ensure that work requests are performed according to the applied resource credits. For example, resource credit balance scheduler 324 and/or virtual compute resource scheduler 322 may determine preemption compensation for a vCPU that has been preempted by a latency-dependent vCPU. A scheduled timeslice for the preempted vCPU may be increased according to the determined preemption compensation. Resource credits for the preemption may be deducted from a resource credit balance for the compute instance associated with the latency-dependent vCPU that preempted the vCPU.

In some embodiments, in response to receiving the scheduling instructions, virtual compute resource scheduler 322 may provide physical scheduling instructions for work requests 336 to physical computing resources, such as physical CPU(s), in various embodiments. In at least some embodiments, virtual compute resource scheduler 322 may be a credit-based scheduler for one or more CPUs.

Resource credit balance scheduler 324 may also report credit balance and usage metrics 362 to monitoring agent 326, which may in turn report these metrics along with any other host metrics 364 (health information, etc.) to resource monitoring module 218.

The examples of implementing variable timeslices for processing latency dependent workloads discussed above with regard to FIGS. 2 and 3 have been given in regard to virtual computing resources offered by a provider network. Various other types or configurations of virtualization hosts or other virtualization platforms may implement these techniques, which may or may not be offered as part of a network-based service. For example, other scheduling techniques different than a credit-based scheduling technique may be implemented to schedule vCPUs for utilizing a physical processing resource. FIG. 4 is high-level flowchart illustrating various methods and techniques for implementing variable timeslices for processing latency-dependent workloads, according to some embodiments. These techniques may be implemented using various components of network-based virtual computing service as described above with regard to FIGS. 2-3 or other virtual computing resource hosts.

As indicated at 410, utilization of a central processing unit (CPU) for a virtual central processing unit (vCPU) may be initiated according to a scheduled timeslice for the vCPU, in various embodiments. A scheduler, or similar, component may be implemented as part of a virtualization host and may, for instance, evaluate multiple vCPUs implemented for virtual compute instances at a virtualization host and select a vCPU to utilize the CPU. Different scheduling policies or techniques may be implemented, such as a fair-share scheduling, round-robin scheduling, or any other scheduling technique. In at least some embodiments, a credit-based scheduler may select vCPUs to utilize the CPU based on a resource credit balance maintained for a virtual compute instance for processing resources. As noted above in FIGS. 2 and 3, resource credits may be applied to increase utilization (e.g., above a baseline utilization) of a physical computer resource for a virtual compute instance. Thus, resources credits may be applied by a scheduler for determining which vCPU selection to make for utilizing the CPU.

When selected for utilization of the CPU, a given vCPU may have a scheduled timeslice (e.g., 20 ms) during which the vCPU may utilize the CPU. In at least some embodiments, a default-sized timeslice may be provided for each vCPU selected to begin utilizing the CPU. As workloads for vCPUs may vary, with some vCPU workloads being processing intensive while other CPU workloads perform smaller tasks, a given vCPU may or may not utilize all of the scheduled timeslice. Some vCPUs may utilize the CPU to perform tasks that are complete without dependence on any other physical computer resource, whereas some vCPUs may perform tasks that depend upon operations performed by other physical computer resources to complete (e.g., various input/output (I/O) operations for storage, input devices, or networking resources). Latency-dependent workloads for vCPUs may be dependent upon the performance of an I/O operation or other physical computer resource in order to continue to make progress with the performance of tasks. Thus, a latency-dependent vCPU may, in various embodiments, enter a wait state prior to the completion of a scheduled timeslice for the latency-dependent vCPU until the performance of the I/O operation or other physical computer resource is complete. For example, vCPUs that perform tasks to send out requests via a network to another computing system, and do not take further action until a response is received back may be considered latency-dependent. In at least some embodiments, a latency-dependent vCPU may be I/O bound. The processing workloads of some vCPUs may utilize the CPU for the entire scheduled timeslice (and beyond if not limited to the scheduled timeslice) and may be sensitive to providing a certain level of throughput for performing tasks. For example, a vCPU workload may be performing various calculations as part of an analysis task (which may not be dependent upon another physical computer resource to be performed). In at least some embodiments, vCPUs that utilize the entire scheduled timeslice may be CPU bound.

The amount of time utilized by latency-dependent vCPUs may be relatively small when compared with vCPUs that utilize the entire scheduled timeslice. Instead of blocking latency-dependent vCPUs from performing work behind vCPUs that utilize an entire scheduled timeslice, preemption may be performed when, for example, the I/O or other physical computer resource operation for which the latency-dependent vCPU was waiting to complete is finished. Preemption may, in various embodiments, be performed to switch utilization of the CPU from one vCPU to another vCPU (e.g., a latency dependent vCPU). A preemption event may be detected, for instance, when a latency-dependent vCPU is ready to begin utilizing the CPU again (e.g., the latency-dependent vCPU is no longer in a wait state). In various embodiments, a latency-dependent vCPU may be identified when it is determined that a vCPU did not utilize all of the immediately previous timeslice for the vCPU (e.g., the last time the vCPU utilized the CPU, the vCPU only utilized the CPU for 3 ms out of a 20 ms timeslice). In some embodiments, a latency-processing option may be maintained for each vCPU. If the latency-processing option is enabled for a vCPU, then preemption may be performed for a vCPU that is identified as latency-dependent. If the latency-processing option is not enabled for vCPU, then preemption may not be performed for a vCPU (whether or not the vCPU utilized all of the immediately previous timeslice for the vCPU). In at least some embodiments, a latency-dependent vCPU may be I/O bound.

As indicated by the negative exit from 420, if a preemption event is not detected, then the vCPU may continue utilizing the CPU for processing. If the timeslice for the vCPU expires, as indicated by the positive exit from 432, then a new vCPU may be selected and begin utilization of the CPU for the selected vCPU. It follows that for some vCPUs a scheduled timeslice may not be increased (in contrast with the scheduled timeslice for some preempted vCPUs as discussed below). If the scheduled timeslice has not expired, as indicated by the negative exit from 422, then utilization of the CPU by the vCPU may continue until preemption (at 420) or upon expiration of the timeslice (at 422).

If the vCPU is preempted by a latency-dependent vCPU, as indicated by the positive exit from 420, then utilization of the CPU may be paused for the vCPU, as indicated at 430. Preemption may be performed by storing a state of the tasks, processes, or other operations performed for the vCPU (e.g., storing register values). The latency-dependent vCPU may utilize the CPU for processing within a scheduled timeslice, which may or may not be the same as the scheduled timeslice for the vCPU that was preempted. In at least some embodiments, the timeslice for the latency-dependent vCPU may be decreased (so as leave room in the overall utilization of the CPU for a preemption compensation as discussed below).

Upon resuming utilization of the CPU for the vCPU (which may be after the latency dependent vCPU has completed utilization of the CPU), a preemption compensation may be determined for the scheduled timeslice of the vCPU. In some embodiments a preemption compensation may be a pre-defined value (e.g., 1 ms). In some embodiments, the preemption compensation may be determined based, at least in part, on a reduction in throughput of the given vCPU as a result of the preemption. For example, the number of CPU cycles to perform operations to restore register values and reload data for performing the processes, tasks, or other operations of the vCPU into a cache may be calculated or timed as they are performed. In some embodiments, a linear function may be implemented such that the preemption compensation is determined based, at least in part, on the amount of time the latency-dependent vCPU utilized the CPU. Other compensation models or functions, such as exponential decay may be implemented. In some embodiments, the cache miss counter for the given vCPU may be monitored (e.g., indicating the amount of time spent reloading data into the cache, which reduces throughput of the given vCPU than if the values still remained in the cache). Preemption compensation may be determined dynamically or on-the-fly such that additional time may be added to the timeslice as the effects of the preemption become known (e.g., more cache misses occur). The scheduled timeslice for the vCPU may then be increased according to the preemption compensation determined for the scheduled timeslice, as indicated at 460. For instance, if the preemption compensation is determined to be 3 ms, then 3 ms may be added to a timer, tracker, or other component that determines the amount of a timeslice consumed for a vCPU and to increase the amount of time that the vCPU may utilize the CPU. In a credit-based scheduler, such as discussed above with regard to FIGS. 2 and 3, resource credits may not be deducted for additional time provided by preemption compensation, in some embodiments.

As illustrated by the arrow from element 460 to element 420, the utilization of the vCPU may be preempted again by another latency-dependent vCPU (either the same or a different latency-dependent vCPU). For instance, some vCPUs may be preempted multiple times, however, the corresponding preemption compensations for the preemptions may allow the vCPU to achieve the same throughput for a single timeslice as if no preemptions had occurred during the timeslice (reducing or eliminating the impact of multiple context switches and/or other operations when a preemption occurs). If no further preemptions occur and/or the increased timeslice expires (as indicated by the positive exit from 422, then a next vCPU may begin utilization of the CPU.

Figure 5:
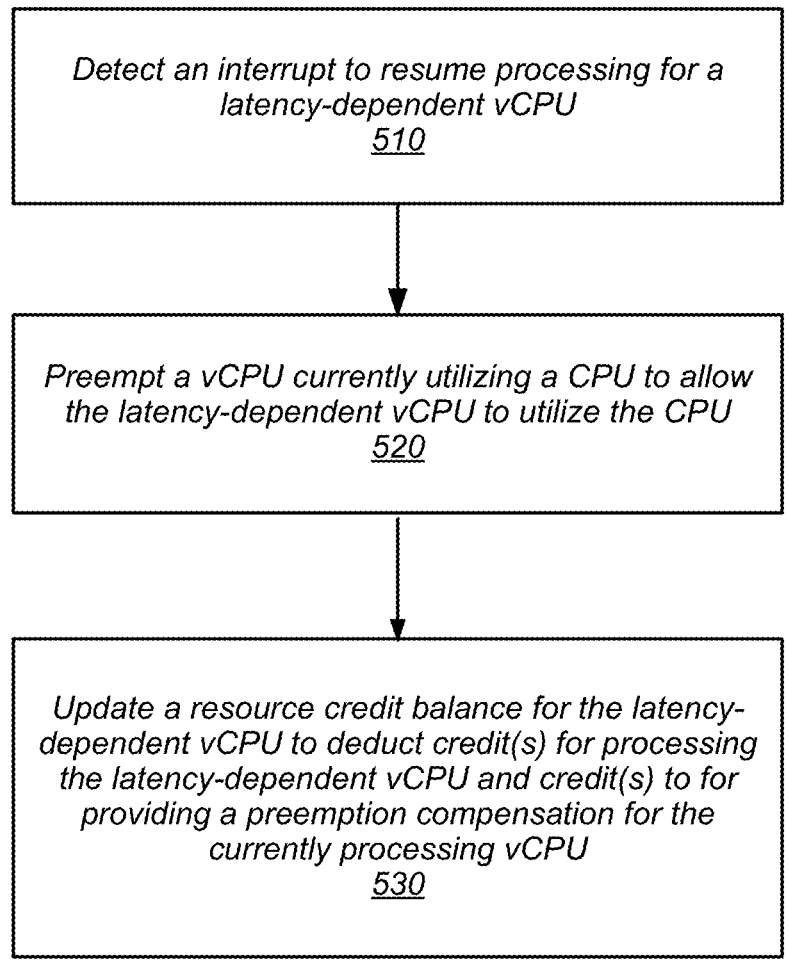
FIG. 5 is a high-level flowchart illustrating various methods and techniques for updating resource credit balances for virtual compute instances for providing preemption compensations, according to some embodiments.

FIGS. 2 and 3, discussed above, provide examples of a credit-based scheduler that may be implemented for utilizing physical computer resources at a virtualization host for a virtual compute instance. Credit-based scheduling may apply credits from a resource credit balance for the virtual compute instance in order to increase utilization of the underlying physical computer resources for the virtual compute instance. In some embodiments, a resource credit balance for processing resources, such as a CPU may be maintained for each virtual compute instance. As a vCPU for a virtual compute instance obtains utilization of the processing resources of a virtualization host, resource credits may be deducted from the resource credit balance for processing for the virtual compute instance. However, providing preemption compensations to some vCPUs may provide no actual compensation if resource credits of the preempted vCPU are applied when using a preemption compensation (as the preempted vCPU is still "paying" for the time used to perform the context switches). If no resources credits are deducted from any resource credit balances, then the "free" utilization time may result in utilization of the processing resources being oversold (e.g., the additional time given to the preempted vCPU may prevent another vCPU from receiving an amount of processing utilization according to the number of resource credits in the resource credit balance for the other vCPU). FIG. 5 is a high-level flowchart illustrating various methods and techniques for updating resource credit balances for virtual compute instances for providing preemption compensations, according to some embodiments.

As indicated at 510, an interrupt to resume processing for a latency-dependent vCPU may be detected, in various embodiments. For example, a network packet may be received, a storage device may return data or an acknowledgment of a write, or any other I/O operation or other physical computer resource operation upon which the latency-dependent vCPU depends may complete and trigger an interrupt or event, which may place the latency-dependent vCPU into a ready to process state. Various scheduling techniques may be used to bump or increase the priority of the latency-dependent vCPU to trigger a preemption event. As indicated at 520, a vCPU currently utilizing the CPU may be preempted to allow the latency-dependent vCPU to utilize the CPU, in various embodiments. When the latency-dependent vCPU is finished utilizing the CPU, the resource credit balance for the latency-dependent vCPU may be updated, as indicated at 530, to deduct credit(s) for utilization of the latency-dependent vCPU and credits for providing a preemption compensation for the currently processing vCPU, in various embodiments. Latency processing may, in such embodiments, be effectively more costly in terms of resource credits than non-latency processing. However, in this way latency processing may provide faster (and therefore lower latency) response for latency-dependent vCPUs and allowing the cost for such processing to be borne by the vCPU initiating the preemption instead of the vCPU being preempted.

The methods described herein may in various embodiments be implemented by any combination of hardware and software. For example, in one embodiment, the methods may be implemented by a computer system (e.g., a computer system as in FIG. 6) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 6:
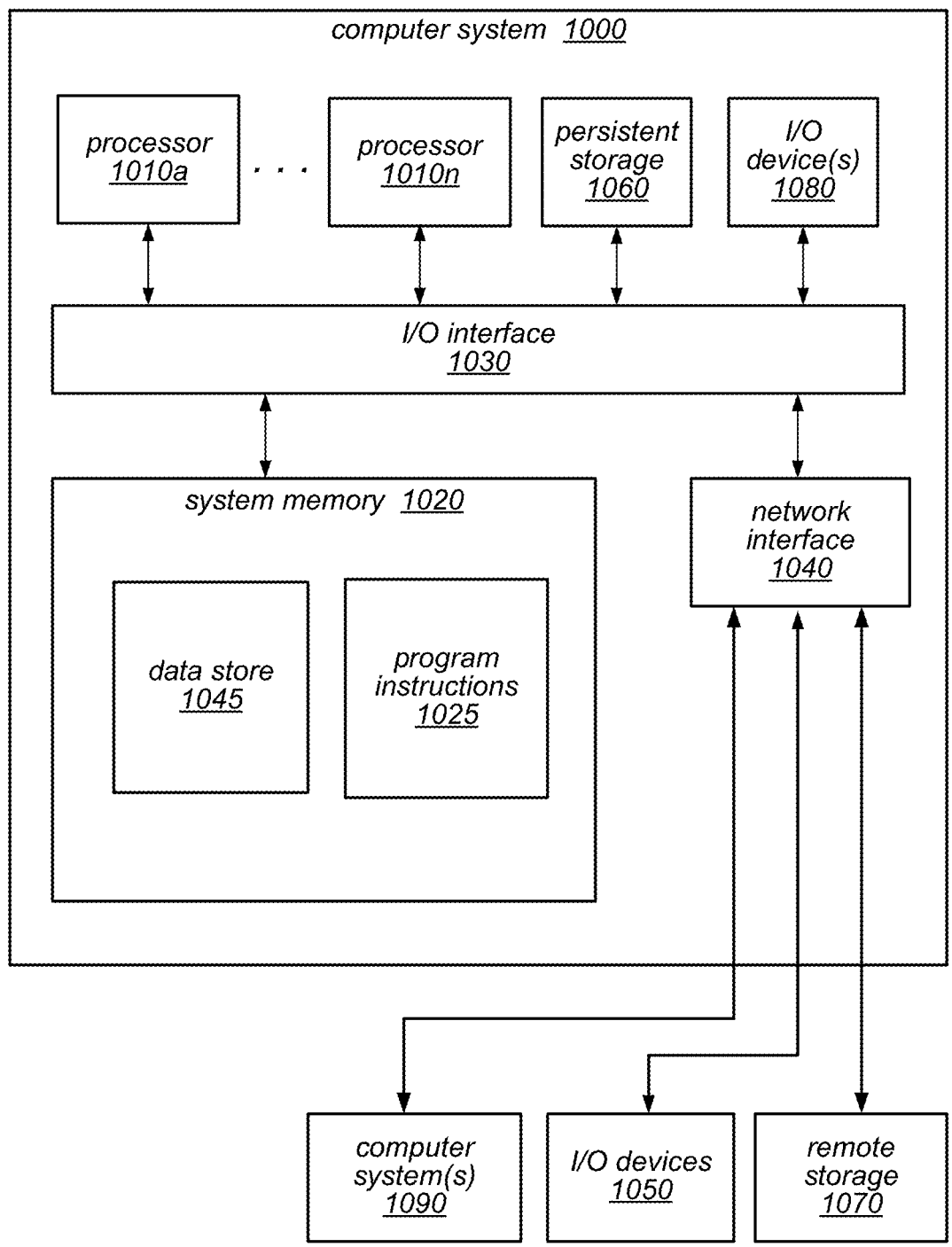
FIG. 6 is a block diagram illustrating an example computing system, according to some embodiments.

Embodiments of variable timeslices for processing latency-dependent workloads as described herein may be executed on one or more computer systems, which may interact with various other devices. FIG. 6 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the provider network described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network and/or virtualization host, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more components of the distributed system described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 6 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor;
   a memory, comprising program instructions that when executed by the at least one processor cause the at least one processor to implement a virtualization host for a plurality of virtual compute instances;
   the virtualization host, configured to:
      for a given virtual central processing unit (vCPU) of a virtual compute instance of the plurality of virtual compute instances, wherein the given vCPU currently utilizes the at least one processor according to a scheduled timeslice:
         preempt the given vCPU to utilize the processor for a latency-dependent vCPU of a different virtual compute instance of the plurality of virtual compute instances, wherein the preemption pauses the utilization of the at least one processor for the given vCPU prior to completion of the scheduled timeslice for the given vCPU;
      prior to preempting the processing of the given vCPU for the latency-dependent vCPU, determine that the latency-dependent vCPU did not complete a previous timeslice to utilize the CPU;
      upon resumption of the utilization of the at least one processor for the given vCPU:
         determine a preemption compensation for the scheduled timeslice of the given vCPU; and
         increase the scheduled timeslice for the given vCPU in response to the preemption compensation such that the utilization of the at least one processor for the given vCPU is performed according to the increased scheduled timeslice.

2. The system of claim 1, wherein the determination of the preemption compensation for the scheduled timeslice of the given vCPU is based, at least in part, on a reduction in throughput as a result of the preemption of the given vCPU.

3. The system of claim 1, wherein the virtualization host implements a credit-based scheduler for scheduling utilization of physical computer resources including the at least one processor among the plurality of virtual compute instances, wherein the virtualization host maintains a respective resource credit balance for the given vCPU and the latency-dependent vCPU, wherein the utilization of the at least one processor for the given vCPU and the latency-dependent vCPU is deducted from the respective resource credit balance, and wherein the virtualization host is further configured to:
   update the respective resource credit balance for the latency-dependent vCPU to deduct one or more resource credits corresponding to the preemption exemption for the given vCPU.

4. The system of claim 1, wherein the virtualization host is implemented as part of a provider network that offers a network-based virtual computing service, wherein the virtualization host is multi-tenant such that at least one of the plurality of virtual compute instances implemented at the virtualization host is maintained for a client of the provider network that is different than another client of the provider network maintaining another one of the plurality of virtual compute instances at the virtualization host.

5. The system of claim 1, further comprising, upon resumption of the utilization of the at least one processor for the given vCPU, decreasing a scheduled timeslice of the latency-dependent vCPU in response to the preemption compensation.

6. A method, comprising:
   performing, by one or more computing devices that together implement a virtualization host for a plurality of virtual compute instances:
      for a given virtual central processing unit (vCPU) of a virtual compute instance of the plurality of virtual compute instances that currently utilizes a central processing unit (CPU) of a virtualization host according to a scheduled timeslice:
         preempting the given vCPU to utilize the CPU for a latency-dependent vCPU of a different virtual compute instance of the plurality of virtual compute instances, wherein the preempting pauses the utilization of the CPU for the given vCPU prior to completion of the scheduled timeslice for the given vCPU;

prior to preempting the processing of the given vCPU for the latency-dependent vCPU, determining that the latency-dependent vCPU did not complete a previous timeslice to utilize the CPU;

upon resuming the utilization of the CPU for the given vCPU:
 determining a preemption compensation for the scheduled timeslice of the given vCPU; and
 increasing the scheduled timeslice for the given vCPU in response to the preemption compensation such that the utilization of the CPU for the given vCPU is performed according to the increased scheduled timeslice.

7. The method of claim 6, wherein the given vCPU is CPU bound.

8. The method of claim 6, wherein determining the preemption compensation for the scheduled timeslice of the given vCPU is based, at least in part, on an amount of time that the latency-dependent vCPU utilized the CPU.

9. The method of claim 6, wherein the virtualization host implements a credit-based scheduler for scheduling utilization of physical computer resources including the CPU among the plurality of virtual compute instances, wherein the virtualization host maintains a respect resource credit balance for the given vCPU and the latency-dependent vCPU, and wherein the utilization of the CPU for the given vCPU and the latency-dependent vCPU is deducted from the respective resource credit balances.

10. The method of claim 9, wherein the method further comprises updating the respective resource credit balance for the latency-dependent vCPU to deduct one or more resource credits corresponding to the preemption exemption for the given vCPU.

11. The method of claim 6, further comprising:
 prior to preempting the processing of the given vCPU for the latency-dependent vCPU, determining that a latency-dependent processing option is enabled for the latency-dependent vCPU, wherein preemption is not performed for another vCPU of another virtual compute instance for which the latency-dependent processing option is not enabled.

12. The method of claim 6, wherein the latency-dependent vCPU is input/output (I/O) bound.

13. The method of claim 6, wherein the virtualization host is implemented as part of a part of a provider network that offers a network-based virtual computing service, wherein the virtualization host is multi-tenant such that at least one of the plurality of virtual compute instances implemented at the virtualization host is maintained for a client of the provider network that is different than another client of the provider network maintaining another one of the plurality of virtual compute instances at the virtualization host.

14. A non-transitory, computer-readable storage medium, storing program instructions that when executed by one or more computing devices cause the one or more computing devices to implement a virtualization host for a plurality of compute instances, wherein the virtualization host implements:
 for a given virtual central processing unit (vCPU) of a virtual compute instance of the plurality of virtual compute instances that currently utilizes a central processing unit (CPU) of the virtualization host according to a scheduled timeslice:
  preempting the given vCPU to utilize the CPU for a latency-dependent vCPU of a different virtual compute instance of the plurality of virtual compute instances, wherein the preempting pauses the utilization of the CPU for the given vCPU prior to completion of the scheduled timeslice for the given vCPU;
  prior to preempting the processing of the given vCPU for the latency-dependent vCPU, determining that the latency-dependent vCPU did not complete an immediately previous timeslice to utilize the CPU;
  upon resuming the utilization of the CPU for the given vCPU:
   determining a preemption compensation for the scheduled timeslice of the given vCPU; and
   increasing the scheduled timeslice for the given vCPU in response to the preemption compensation such that the utilization of the CPU for the given vCPU is performed according to the increased scheduled timeslice.

15. The non-transitory, computer-readable storage medium of claim 14, wherein determining the preemption compensation for the scheduled timeslice of the given vCPU is based, at least in part, on a reduced throughput as a result of the preemption of the given vCPU.

16. The non-transitory, computer-readable storage medium of claim 14, wherein the virtualization host implements a credit-based scheduler for scheduling utilization of physical computer resources including the CPU among the plurality of virtual compute instances, wherein the virtualization host maintains a respect resource credit balance for the given vCPU and the latency-dependent vCPU, and wherein the utilization of the CPU for the given vCPU and the latency-dependent vCPU is deducted from the respective resource credit balances.

17. The non-transitory, computer-readable storage medium of claim 16, wherein the program instructions further cause the virtualization host to implement updating the respective resource credit balance for the latency-dependent vCPU to deduct one or more resource credits corresponding to the preemption exemption for the given vCPU.

18. The non-transitory, computer-readable storage medium of claim 14, wherein the program instructions cause the virtualization host to further implement:
 prior to the completion of the increased scheduled timeslice, performing the preempting, the determining and the increasing for the latency-dependent vCPU or another latency-dependent vCPU.

19. The non-transitory, computer-readable storage medium of claim 14, wherein the program instructions cause the virtualization host to further implement:
 prior to preempting the processing of the given vCPU for the latency-dependent vCPU, determining that a latency-dependent processing option is enabled for the latency-dependent vCPU, wherein preemption is not performed for another vCPU of another virtual compute instance for which the latency-dependent processing option is not enabled.

20. The non-transitory, computer-readable storage medium of claim 14, wherein the virtualization host is implemented as part of a part of a provider network that offers a network-based virtual computing service, wherein the virtualization host is multi-tenant such that at least one of the plurality of virtual compute instances implemented at the virtualization host is maintained for a client of the provider network that is different than another client of the provider network maintaining another one of the plurality of virtual compute instances at the virtualization host.

* * * * *